Patented June 1, 1926.

1,587,333

UNITED STATES PATENT OFFICE.

WALTER W. KING, OF NEW BRIGHTON, NEW YORK, ASSIGNOR TO THE BARRETT COMPANY, A CORPORATION OF NEW JERSEY.

PROCESS OF PRODUCING VARNISH.

No Drawing.   Application filed February 9, 1921.   Serial No. 443,655.

This invention relates to a process of making varnishes. It relates more particularly to a process by which so-called paracoumaron resin is compounded with a suitable oil or oils in order to make a varnish which shall be cheap to manufacture, and which shall possess the desirable properties required in varnishes. So-called paracoumaron resin is obtained by polymerizing the polymerizable constituents in crude solvent naphtha and distilling off the solvent, leaving the resin as a residue. The resin varies in melting point from 100° C. to 200° C., more or less, and may be light or amber colored. It is unsaponifiable, neutral, waterproof, and is resistant to acids and alkalis.

In the old and well known processes of varnish manufacture, gums or resins of vegetable origin usually having melting points around 500° F. to 650° F. are introduced into a varnish kettle, which is heated until the resin melts, the mass being stirred to assist evolution of vapors and to enable the operator to ascertain when the proper consistency has been reached. Hot oil, such as tung oil or linseed oil is then slowly added to the melted resin until the proper amount has been introduced. The mixture is then withdrawn and cooled, after which a drier may be added, if necessary, and then the proper amount of a thinner, such as turpentine, alcohol or petroleum, for example, is added. In making varnishes in this way it is necessary to exercise care not to have the resin either overcooked or undercooked, since either condition will cause separation and the mixture is not homogeneous. Also, during this cooking or melting of the resin, considerable loss occurs, sometimes amounting to as much as 25% of the weight of the best and hardest resins.

In the present invention, by the use of paracoumaron resin I am enabled to change the procedure and avoid some of the difficulties and the large loss heretofore encountered, while at the same time clear and light colored varnishes that have a high luster are obtained. In carrying out this invention a varnish is compounded by using paracoumaron resin with tung, linseed, soya bean, menhaden, perilla, cottonseed, or other drying or semi-drying oils, as this resin is soluble in these oils. Instead of melting the resin and then introducing the oil, as above described for the old practice, I heat the oil to the proper temperature and introduce the resin thereinto, which readily dissolves in the oil with practically no loss from evaporation, but at the same time a thoroughly homogeneous mixture of the oil and resin is obtained. After the resin has been compounded with the oil, driers and thinners may be added in the usual way. Different sorts of driers including cobalt, manganese and lead salts, for example, have been successfully used. The cobalt salts have been found to be most satisfactory when used in proper proportions, and the results have shown this salt to possess uniform and strong drying properties giving a varnish that is light in color and free from skin burning and wrinkles. The usual thinners, such as turpentine, wood spirits, petroleum, and coal tar naphthas, have been used and found suitable, but alcohol alone is unsatisfactory as paracoumaron resin is not sufficiently soluble therein.

The invention will be illustrated by the following specific examples whereby varnishes of different characteristics and suitable for different uses are produced, but it is to be understood that the invention is not restricted to the particular proportions or ingredients specified, as the same are given for illustrative purposes to make the invention clearly understood.

For example, in making a short oil or rubbing varnish I may heat about 100 pounds of tung oil, preferably in a copper varnish kettle, to a temperature of approximately 470° F. and add thereto about 75 pounds of paracoumaron resin while stirring the oil. The temperature may then be increased to about 530° F. and this temperature maintained until a drop of the mixture on cold glass would set in a hard button. An additional amount, say 25 pounds, of paracoumaron resin may then be added while continually stirring the mixture. It is important to get the proper body without the material being caused to string, and the method just described enables one to do this. A drier consisting of about 1 pound of solid cobalt linoleate is then added, after which approximately 200 pounds of a thinner, such as turpentine, petroleum or solvent naphtha is added. This procedure produces varnish which has a high luster, can be polished without "sweating" and flows very easily so that it can be applied with a brush or spray.

In making a medium oil or floor varnish I may heat about 125 pounds of tung oil to approximately 470° F. and introduce therein about 75 pounds of paracoumaron resin while stirring to prevent the resin from sticking to the bottom of the kettle. After about 10 minutes the temperature may be increased to approximately 530° F. and maintained until a drop of the mixture will set to a hard button. An additional amount, say about 25 pounds, of paracoumaron resin, together with about 18 pounds of linseed oil, may be added while the stirring is continued. The addition of a drier and a thinner is similar to that above described for a rubbing varnish, except that about 50% more of each will usually be found advisable. This procedure produces a varnish which has an excellent luster, is hard and tough, and corresponds to the so-called all-purpose varnishes. It dries quickly, is waterproof, and can be rubbed after two or three days.

In making a spar or long oil varnish I may introduce about 150 pounds of tung oil and 75 pounds of vegetable resin into a varnish kettle and heat the mixture to about 535° F. When the mixture strings, about 75 pounds of linseed oil is added to chill the same, after which about 100 pounds of paracoumaron resin may be added and the mixture heated to about 510° F. for fifteen to thirty minutes, or until the proper body is obtained. The mixture is then cooled, about 2½ pounds of cobalt linoleate added as a drier and about 380 pounds of a thinner is added. It has been found that paracoumaron resin will not retard the polymerization or jelling of tung oil as effectively as a vegetable resin will, so it is advisable to use a small amount of vegetable resin, as above indicated, although this is not absolutely necessary. It has been found that this varnish is weatherproof and that the use of the paracoumaron resin therein improves the luster and materially increases the resistance of the film, thus permitting the use of a large proportion of linseed oil in place of tung oil, and that the paracoumaron resin decreases the acidity of the finished product and gives a varnish that has an excellent elasticity.

Whatever varnish oil is used, whether tung oil or one of the other oils, the oil should be heated to a point below its gelatinizing or breaking temperature before the paracoumaron resin is added. The varnishes produced in accordance with this invention have been found to mix homogeneously with other varnishes and may, therefore, be substituted in whole or in part for varnishes heretofore made with vegetable gums or resins. Since paracoumaron resins of light color are available in large quantities at small cost, excellent varnishes can be cheaply made in accordance with this invention, possessing the properties usually desirable in varnishes, together with the improved characteristics above mentioned.

I claim:

1. The process of producing varnish, which comprises heating a drying oil to about 470° F., adding paracoumaron resin, increasing the temperature, maintaining the heat until the mixture would set when cold, and adding more paracoumaron.

2. The process of producing varnish, which comprises heating a drying oil to about 470° F., adding paracoumaron resin, increasing the temperature to about 530° F., and maintaining the heat until the mixture would set when cold.

3. The process of producing varnish, which comprises heating tung oil to about 470° F., adding paracoumaron resin, increasing the temperature to about 530° F., and maintaining the heat until the mixture would set when cold.

In testimony whereof I affix my signature.

WALTER W. KING.